(12) United States Patent
Mignault

(10) Patent No.: US 6,269,285 B1
(45) Date of Patent: Jul. 31, 2001

(54) SELF-SERVICE FREEZER CHEST WITH INVENTORY MONITORING MEANS

(76) Inventor: Daniel R. Mignault, 1212 Hidden Ridge #3048, Irving, TX (US) 75038

( * ) Notice: Subject to any disclaimer, the term of this patent is extended or adjusted under 35 U.S.C. 154(b) by 0 days.

(21) Appl. No.: 08/970,299

(22) Filed: Nov. 14, 1997

(51) Int. Cl.$^7$ .................................................. G06F 17/00
(52) U.S. Cl. ........................ 700/236; 700/244; 700/231; 221/150 R; 221/131; 221/123; 221/279; 312/2; 312/236; 312/312; 312/319.1; 62/246; 62/250; 62/337; 206/804; 206/45.16
(58) Field of Search ................................ 221/150 R, 131, 221/123, 279; 312/2, 236, 312, 319.1, 61, 71; 62/246, 250, 337; 206/804, 45.16; 700/231, 236, 246, 240, 244

(56) References Cited

U.S. PATENT DOCUMENTS

| | | | |
|---|---|---|---|
| 2,397,403 | * | 3/1946 | Bishop ..................................... 312/36 |
| 2,499,089 | * | 2/1950 | Brill et al. ............................. 62/89.5 |
| 3,724,715 | * | 4/1973 | Aurienma ................................. 221/4 |
| 3,757,533 | * | 9/1973 | Kent ....................................... 62/303 |
| 3,926,001 | * | 12/1975 | Webb ..................................... 62/378 |
| 3,986,758 | * | 10/1976 | Heaney ................................. 312/236 |
| 4,108,363 | * | 8/1970 | Susumu ................................. 235/383 |
| 4,398,651 | * | 8/1983 | Kumpfer ................................. 221/6 |
| 4,782,670 | * | 11/1988 | Long et al. ............................. 62/457 |
| 4,794,764 | * | 1/1989 | Dyment et al. ......................... 62/250 |
| 4,797,819 | | 1/1989 | Dechirot ................................ 364/403 |
| 4,870,835 | * | 10/1989 | Wolfe et al. ............................ 62/246 |
| 4,910,970 | * | 3/1990 | Keeping ................................. 62/250 |
| 4,916,923 | * | 4/1990 | Adams et al. ......................... 62/457 |
| 4,941,327 | * | 7/1990 | Miles .................................... 62/246 |
| 5,105,978 | * | 4/1992 | Troutead et al. ................ 221/150 R |
| 5,207,784 | | 5/1993 | Schwartzendruber ................... 221/6 |
| 5,261,253 | * | 11/1993 | Spenard ................................. 62/250 |
| 5,305,615 | * | 4/1994 | McFadden et al. .................... 62/378 |
| 5,458,232 | * | 10/1995 | Novak et al. ....................... 206/45.16 |
| 5,570,811 | * | 11/1996 | Wittern, Jr. et al. ................. 221/127 |
| 5,608,643 | * | 3/1997 | Wichter et al. ................. 364/479.14 |
| 5,844,808 | * | 12/1998 | Konsmo et al. ............... 364/479.14 |
| 5,939,974 | * | 8/1999 | Heagle et al. ................. 340/286.09 |
| 5,975,348 | * | 11/1999 | Rudewicz et al. .................... 221/150 |
| 5,992,969 | * | 11/1999 | Arminana Terrasa et al. ........ 347/37 |
| 5,997,170 | * | 12/1999 | Brodbeck ....................... 364/479.06 |

FOREIGN PATENT DOCUMENTS 2 263 474 * 7/1993 (GB) ................................. 221/279

* cited by examiner

Primary Examiner—Christopher P. Ellis
Assistant Examiner—Michael E. Butler
(74) Attorney, Agent, or Firm—Dennis T. Griggs

(57) ABSTRACT

A freezer chest for storing and displaying frozen foods such as packaged ice cream products for sale to retail customers includes a modular storage bin in which a product stack plate is mounted on a helical support spring. Packaged ice cream products are loaded onto the product stack plate. The product stack plate, urged by the helical spring, advances the stack of frozen products to the top of the storage bin as products are removed by customers. A permanent magnet mounted on the product stack plate generates a magnetic field that couples with position sensors mounted in a vertical array along the storage bin. Each sensor produces an output signal in response to coupling alignment of the magnetic field with the sensor as the stack plate moves through the storage bin. The helical support spring extends the stack plate incrementally in proportion to the weight load removed as each packaged product is unloaded. A controller receives the output signal from each sensor, generates a digital data word corresponding with the product stack height in each bin, and stores the data word for retrieval by a central computer at a remote location.

3 Claims, 3 Drawing Sheets

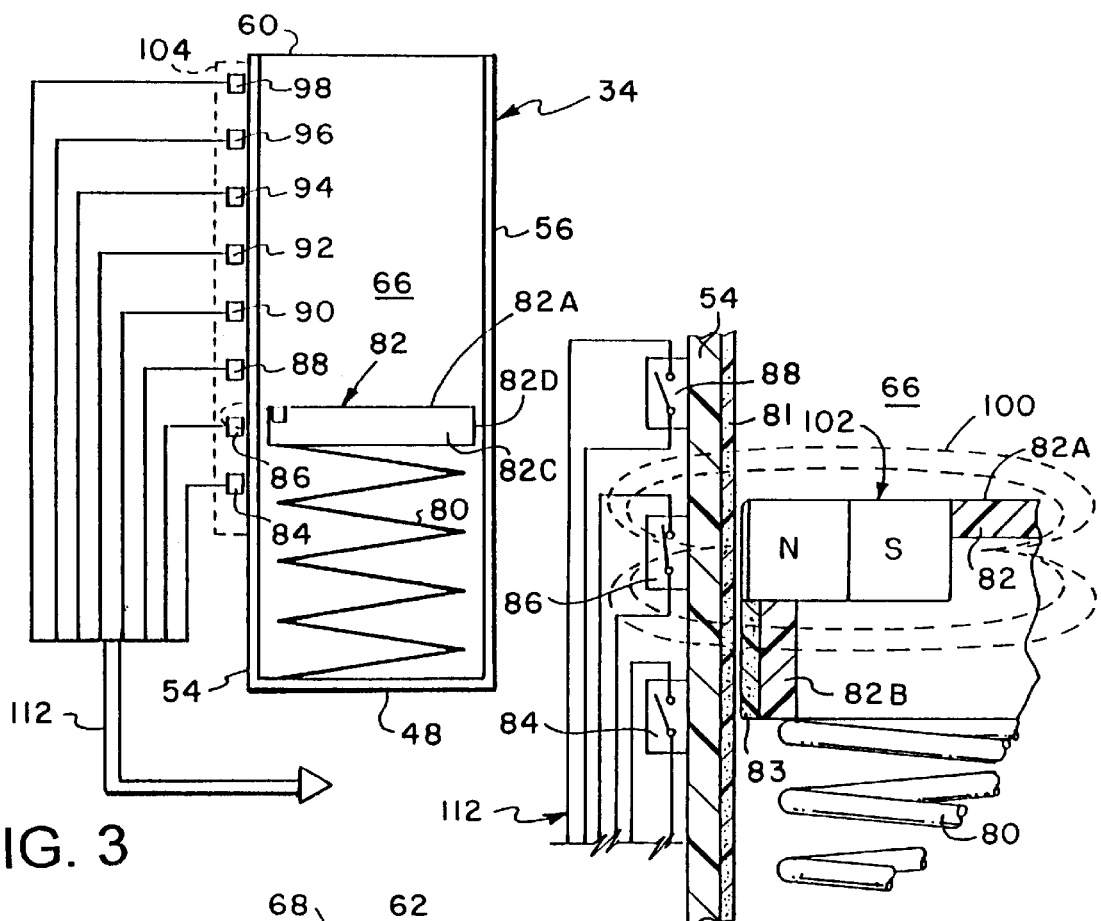
FIG. 3
FIG. 5
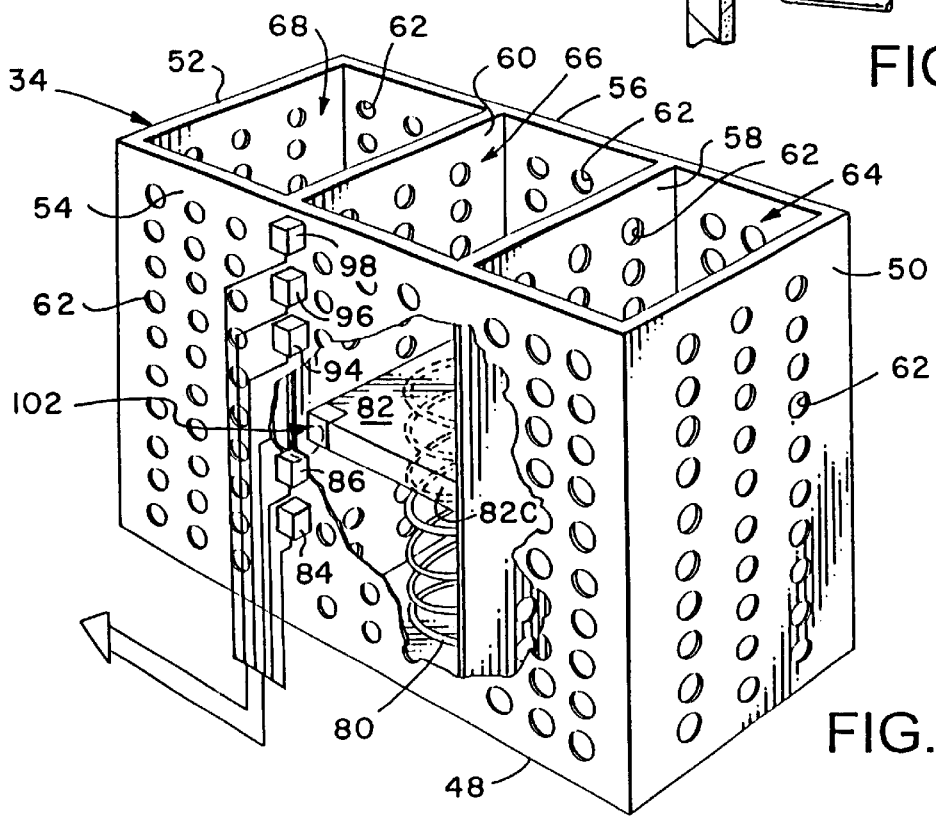
FIG. 4

SELF-SERVICE FREEZER CHEST WITH INVENTORY MONITORING MEANS

BACKGROUND OF THE INVENTION

This invention is generally related to self-service freezer chests of the type used for displaying and selling frozen comestibles, including packaged ice cream products.

Coin-operated vending machines are in widespread use for selling packaged food products to customers in retail establishments such as convenience stores and service stations. For example, vending machines offer packaged snack items such as chewing gum, nuts and candy bars at room temperature; while another vending machine in the same location may supply hot coffee and still another, frozen ice cream products. A single payment is made by coin deposit into the vending machine for each selection, and the products are selected and dispensed one at a time.

Most vending machines include a transparent panel that permits the customer to view individual food items. Customers purchase a product by depositing one or more coins into the vending machine and pushing a lever or button to select a product. Only one product is vended at a time, and vending occurs only after pre-payment.

In the operation of a self-service freezer chest, pre-payment is not required. A transparent sliding cover or a hinged door can be opened by the customer to gain access to all frozen food products in the freezer compartment at the same time. A customer views the products through the transparent cover, opens the cover and retrieves his selection. The customer may retrieve one or more selections since all products in the freezer chest are simultaneously available. After retrieving one or more products, the customer then proceeds to a cashier and makes payment.

Coin-operated vending machines and self-service freezer chests in convenience stores and other retail outlets are usually owned, stocked and maintained by a distributor who bargains with retail proprietors in a particular market area for floor space. The distributor provides the dispensing units and sells the food products to the retail proprietor at an agreed wholesale price. Typically, a distributor maintains and restocks 200 to 500 dispensing units in various retail stores in a small market territory. In a medium-sized territory, the distributor services 500 to 1500 units, and in a large territory, the distributor services 1500 or more units.

The distributor maintains a warehouse for stocking the packaged products in bulk. The responsibility for maintaining and restocking the units in a particular territory is assigned to a route salesman. Periodically, the salesman visits the operating locations on his route to restock and maintain the dispensing units. The route salesman's duties include loading a delivery truck with various products in a quantity sufficient to restock all of the units assigned to a particular route. After loading the delivery truck, the salesman makes his rounds, visits each retail store on his route and determines what items are needed, restocks each unit, performs maintenance as needed, and prepares an invoice. If a freezer chest or dispensing unit does not require product or service, the salesman proceeds to the next stop. The cost per stop can amount to as much as 2%–3% of the total monthly service overhead allocated to the typical dispensing unit.

There are several inventory monitoring systems that provide remote monitoring of stock levels in coin-operated vending machines. For example, such systems are described in U.S. Pat. No. 5,608,643 and U.S. Pat. No. 5,207,784 in which an inventory management system remotely monitors the number of products vended at retail store locations. In U.S. Pat. No. 5,608,653, the system includes a counter that counts packaged products as each product is dispensed and dropped across a mechanical flipper. In U.S. Pat. No. 5,207,784, an optical sensor detects a packaged product as it moves through a vending passage, thus generating a product sales count signal that is stored in memory. Inventory information, including the type and quantity of products vended from each unit, is transmitted by modem to an inventory control center for review prior to the next delivery.

Presently, conventional inventory monitoring systems for coin-operated vending machines are not compatible with self-service freezer chests. Consequently, current inventory information for self-service freezer chests is not available to the route salesman. He must overstock his delivery truck so that enough product will be available to replenish all the freezer chest units on his route. Moreover, the salesman is not aware of the locations that will not require restocking on any particular visit. This is an inherently inefficient situation resulting in unnecessary operating expenses and lost sales.

Packaged ice cream products are impulse purchase items that require a clearly visible display to attract customers. The storage bins of conventional freezer chests are deliberately limited in depth so that a customer can see and easily retrieve ice cream items even when the bins are nearly empty. Typically, the bins are wire baskets that hang from console shoulders and extend only about halfway into the freezer compartment. Consequently, the available stock of each item is limited by the depth of the bin.

It becomes more difficult for a customer to inspect and select the frozen ice cream products as the storage bins are depleted. Some freezer compartments do not include internal illumination, thus making it difficult to identify the products that are near the bottom of the bin. As a consequence, some sales will be lost because of the customer's inability to notice or quickly identify a desired product, and also because of the inconvenience caused by the requirement for a close inspection of the products at the bottom of the bin.

Moreover, when the storage bins are low, some customers find it necessary to hold the freezer door open for an extended period while searching and sorting for a particular item, thus causing a loss of the chill factor within the freezer compartment. There is also a disadvantage in that frozen food products that are found near the bottom of a bin are difficult to reach and are considered by some customers to be "out-of-date", stale or "picked over", thus imparting an impression of inferior quality, all leading to lost sales or customer dissatisfaction. One attempt to overcome this particular problem involved the use of two or more stackable baskets that were initially fully stocked and stacked one above the other, and after the upper basket was sold out, it was replaced by the fully loaded lower basket. However, this method has met with little success because it requires the baskets to be rotated from time-to-time, and the route salesman, who has the responsibility for maintaining the freezer chest, is not likely to be present when bin replacement is needed.

Accordingly, there is a need for a system for remotely monitoring the inventory of freezer chest storage units. Moreover, there is a continuing interest in improving the construction of self-service freezer chests so that the frozen products in each storage bin are clearly visible and readily available for inspection and retrieval at all times.

BRIEF SUMMARY OF THE INVENTION

The improved freezer chest and inventory monitoring system of the present invention substantially reduces the problems associated with restocking and operating conventional self-service freezer chests. According to one embodiment of the invention, a system for remotely monitoring the inventory in a self-service freezer chest includes a freezer chest with multiple storage bins disposed within a freezer compartment, each storage bin including a vertically movable stack plate for holding a stack of frozen products, a coil spring yieldably supporting the stack plate, and multiple position sensors mounted in close proximity along each bin for producing an output position signal in response to the magnetic field of a permanent magnet carried by the stack plate.

The coil spring is characterized by a linear deflection response to an increasing or decreasing weight load within a predetermined load range. An output signal is produced in response to coupling alignment of the magnetic field with each position sensor. Each output signal uniquely identifies the resting position of the base plate relative to the empty (no load) reference position in the bin, thus providing a measure of the stack height and total spring deflection L. The product weight load W supported by the coil spring is directly proportional to the total length of spring deflection from the no load (bin empty) position, and is calculated by the relation $W=KL$, where K is the spring deflection constant in pounds per inch deflection and L is the total spring deflection in inches as measured from the no load (bin empty) reference position. Since the load volume of each product bin is known and the frozen products in each bin are uniform in size and weight, the number of products contained within each bin can be closely approximated at a particular resting position from the total spring deflection measurement L.

A data word corresponding to the total spring deflection L for each bin is then electronically calculated and stored in the memory unit of a controller mounted on the back of the freezer chest. The controller is interrogated by a computer in a remote inventory control center, via a telephone modem link, to retrieve real time product stack data for each freezer unit. The inventory replacement requirements for each bin are determined by cross-referencing each product stack data word with previously stored replacement values in a look-up table that has been customized for each bin size and product type. The distributor then uses the inventory information to determine the type and amount of each product to be loaded on the delivery truck for each route within his territory.

The novel features which characterize the invention are defined by the appended claims. The foregoing and other objects, advantages and features of the invention will hereinafter appear. For purposes of illustration of the invention, but not of limitation, a more complete understanding of the advantages of the present invention may be acquired by referring to the drawing wherein the reference numbers indicate the features.

BRIEF DESCRIPTION OF THE DRAWING

The figures of the accompanying drawing are incorporated into and form a part of the specification to illustrate the preferred embodiments of the present invention. Throughout the drawing, like reference numerals designate corresponding elements. This drawing, together with the description, serves to explain the principles of the invention and is only for the purpose of illustrating exemplary embodiments showing how the invention can best be made and used. The drawing should not be construed as limiting the invention to the illustrated and described embodiments. Various advantages and features of the invention will be understood from the following detailed description taken in connection with the appended claims and with reference to the attached drawing in which:

FIG. 3 is a simplified diagram of a base plate and coil spring arrangement including a permanent magnet and multiple sensors;

FIG. 4 is a perspective view of a storage bin, partially broken away showing a base plate mounted on a coil spring;

FIG. 5 is an enlarged sectional view, partly broken away, of the permanent magnet and sensor assembly shown in FIG. 3; and, FIG. 6 is a schematic block diagram illustrating the interconnection of sensors and controller components.

DETAILED DESCRIPTION OF THE INVENTION

Figure 1:
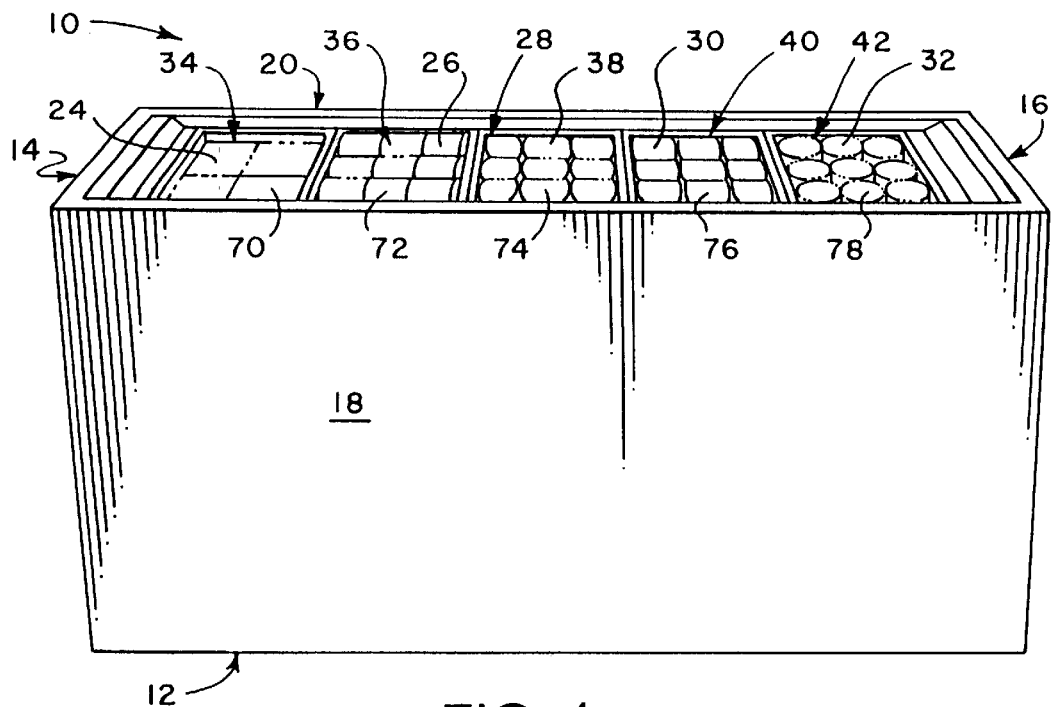
FIG. 1 is a front perspective view of a self-service freezer chest loaded with frozen ice cream products.

Preferred embodiments of the invention are described herein to explain how the invention can be made and used. Like reference numerals are used throughout the description and several views of the drawing to indicate like or corresponding parts. In addition, references made to horizontal and vertical planes are intended to describe the orientation of the storage bins in the upright, free-standing operative position.

Figure 2:
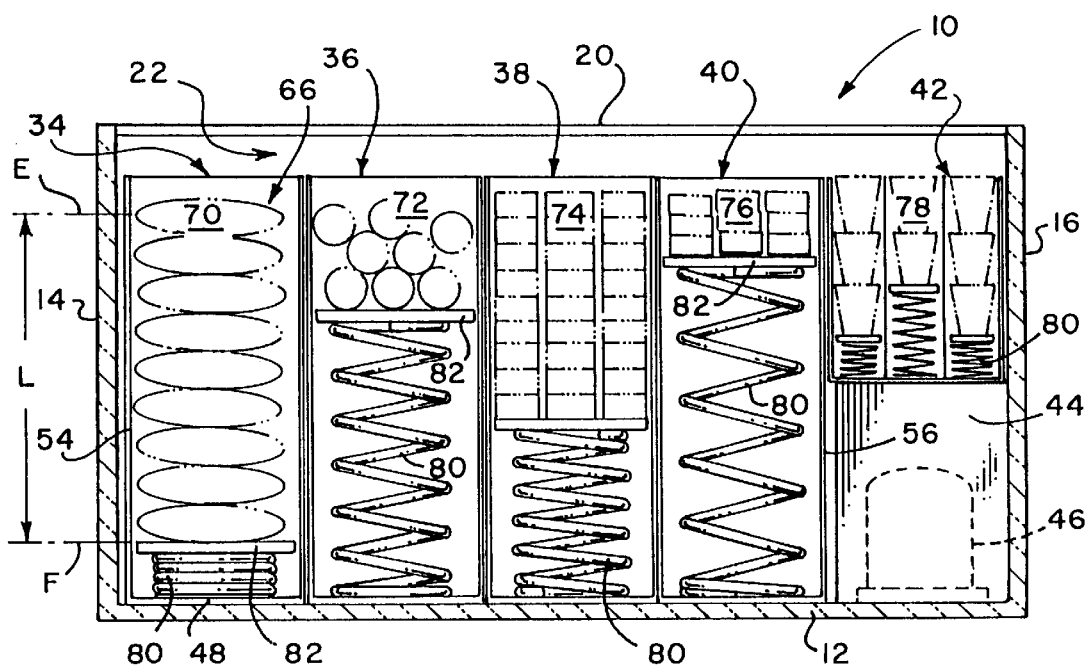
FIG. 2 is a front elevational view, with the front panel removed, of the freezer chest of FIG. 1.

Referring now to FIG. 1 and FIG. 2, a freezer chest or console storage unit 10 includes an insulated bottom wall 12, left and right sidewalls 14, 16 and front and rear sidewalls 18, 20 that are interconnected to enclose a refrigerated compartment 22. The top of the storage chest is covered by transparent doors 24, 26, 28, 30 and 32 that are mounted along longitudinal tracks formed on the front and rear sidewalls for movement between open and closed positions overlying the refrigerated compartment. Multiple storage bins 34, 36, 38, 40 and 42 are assembled in a side-by-side, free-standing arrangement within the refrigerated compartment.

Preferably, the storage bins 34, 36, 38 and 40 stand upright on the interior refrigerated surface of the bottom sidewall 12. The storage bin 42 rests on top of an internal housing 44 which contains a compressor 46. As is conventional in this type of freezer chest, the compressor 46 discharges refrigerant through cooling coils that are contained within the sidewalls. Each storage bin is constructed as a free-standing modular unit that can be manually inserted into and withdrawn from the refrigerated compartment 22.

Referring now to FIG. 3 and FIG. 4, the storage bin 34 is typical of all of the construction of storage bins, and is preferably a molded assembly constructed of acrylic buratic styrene (ABS) resin. The storage bin 34 includes a bottom panel 48, front and rear panels 50, 52 and left and right side panels 54, 56. The storage bin is partitioned by one or more internal panels, for example partition panels 58, 60. Preferably, the sidewalls and the interior partition panels are intersected by multiple air flow openings 62.

Referring again to FIG. 1 and FIG. 2, the base panel 48 and the sidewall panels 54, 56 together with the internal partition panels 60, 62 define three internal product storage spaces 64, 66 and 68. According to this arrangement, the base panel, sidewall panels and internal partition panels form the boundaries of separate storage spaces in which stacks of frozen packaged products can be loaded. Each storage bin contains separate stacks of different ice cream products 70, 72, 74, 76 and 78. As can best be seen in FIG. 1 and FIG. 2, the top opening of each storage bin is positioned closely adjacent to the underside of the transparent cover panels, and the packaged ice cream products are presented near the top of each storage bin so that the frozen products are clearly visible for selection and are easily accessible.

Referring now to FIG. 2 and FIG. 4, a coil spring 80 is secured to the base panel 48 in an upright orientation for extension and retraction within the product load space 66. The coil spring is yieldably deflectable relative to the base panel within the product load space. The coil spring 80 is characterized by a substantially linear axial deflection in response to the application of a product weight load throughout a predetermined product weight load range, for example from about one pound to about fifteen pounds. In the preferred embodiment, the coil spring is made of 0.162 inch diameter galvanized hard drawn spring steel wire, coiled at six inches O.D., and having a deflection constant K=0.625 pounds per inch.

According to this arrangement, the packaged ice cream products 70 are loaded onto the stack plate 82 to form an upright product stack. The product stack plate 82, urged by the coil spring 80, advances the stack of frozen products to the top of the storage bin as products are removed by the customers. Additional frozen product remains is advanced to the top of each bin as products are removed by customers.

Referring again to FIG. 3 and FIG. 4, the stack plate 82 includes a flat platform surface 82A and peripheral side flange portions 82B, 82C and 82D. The side flange portions stabilize the stack plate 82 by maintaining the flat platform surface 82A in a horizontal orientation. The flange portions also reduce friction and prevent binding of the plate 82 against the bin sidewall surfaces. Preferably, the sidewall panels and the peripheral flange portions are coated with a layer of fluorinated polymer resin, for example polytetrafluoroethylene resin (PTFE), sold under the trademark TEFLON®, fluorinated ethylene propylene resin (FEP), and fluorosilicone polymer resin. Referring to FIG. 5, the low friction coating on the bin sidewalls is identified by the reference numeral 81, and the coating layer on the stack plate flange portions is identified with the reference numeral 83.

As packaged products are loaded into each storage bin, the coil spring 80 deflects downwardly by an incremental distance proportional to the product weight added until the stack plate reaches a reference level F that corresponds with a full bin. As products are removed from the storage bin 66, the calibrated spring 80 deflects upwardly by an incremental distance proportional to the product weight removed until the stack plate 82 reaches a reference level E that corresponds with an empty or almost empty bin. The distance L between the reference levels corresponds with the stack height of a full bin.

Referring now to FIG. 3 and FIG. 5, multiple position sensors 84, 86, 88, 90, 92, 94, 96 and 98 are mounted along each bin for producing an output position signal in response to a magnetic field 100 produced by a permanent magnet 102 carried by the stack plate 82. As shown in FIG. 3 and FIG. 4, the position sensors are mounted at vertically spaced locations along the left sidewall 54 in a linear array 104.

Preferably, each position sensor is a magnetic reed switch which has a movable contact that closes an electrical circuit in the presence of a magnetic field, substantially as shown in FIG. 5. The position sensor 86 is in the closed circuit (true logic state 1). The other position sensors, that are not coupled or linked to the magnetic field 100, are in the open circuit condition (complement logic state 0).

According to this arrangement, an output signal is produced in response to coupling alignment or linking of the magnetic field 100 with each position sensor. Each output signal uniquely identifies the resting position of the base plate relative to the empty (no load) reference position E, thus providing a measure of the stack height and total spring deflection L.

In the preferred embodiment, the inside dimensions (I.D.) of each bin storage space is 8"W×8"×D×22"H. Taking into account the dimensions of the fully compressed coil spring 80 and stack plate 82, this yields a product stack dimension L of about 18". The position sensors are vertically spaced apart on one inch centers, along the upper half of the storage bin sidewall. The deflection coefficient of the coil spring 80 is substantially linear for deflections amounting to about one-half to two-thirds the total deflection length. The coil spring undergoes some non-linearity in its response as it nears its compression limit.

Preferably, the linear sensor array 104 is aligned vertically along at least the upper half of the storage bin, extending from the no-load (empty bin) position E to a deflection distance of at least one-half L, and preferably about two-thirds L as measured from the no-load level E. By this arrangement, the position sensors are located in the deflection zone where the spring exhibits its linear deflection characteristic, and thus provides the most accurate load measurements.

Figure 6:
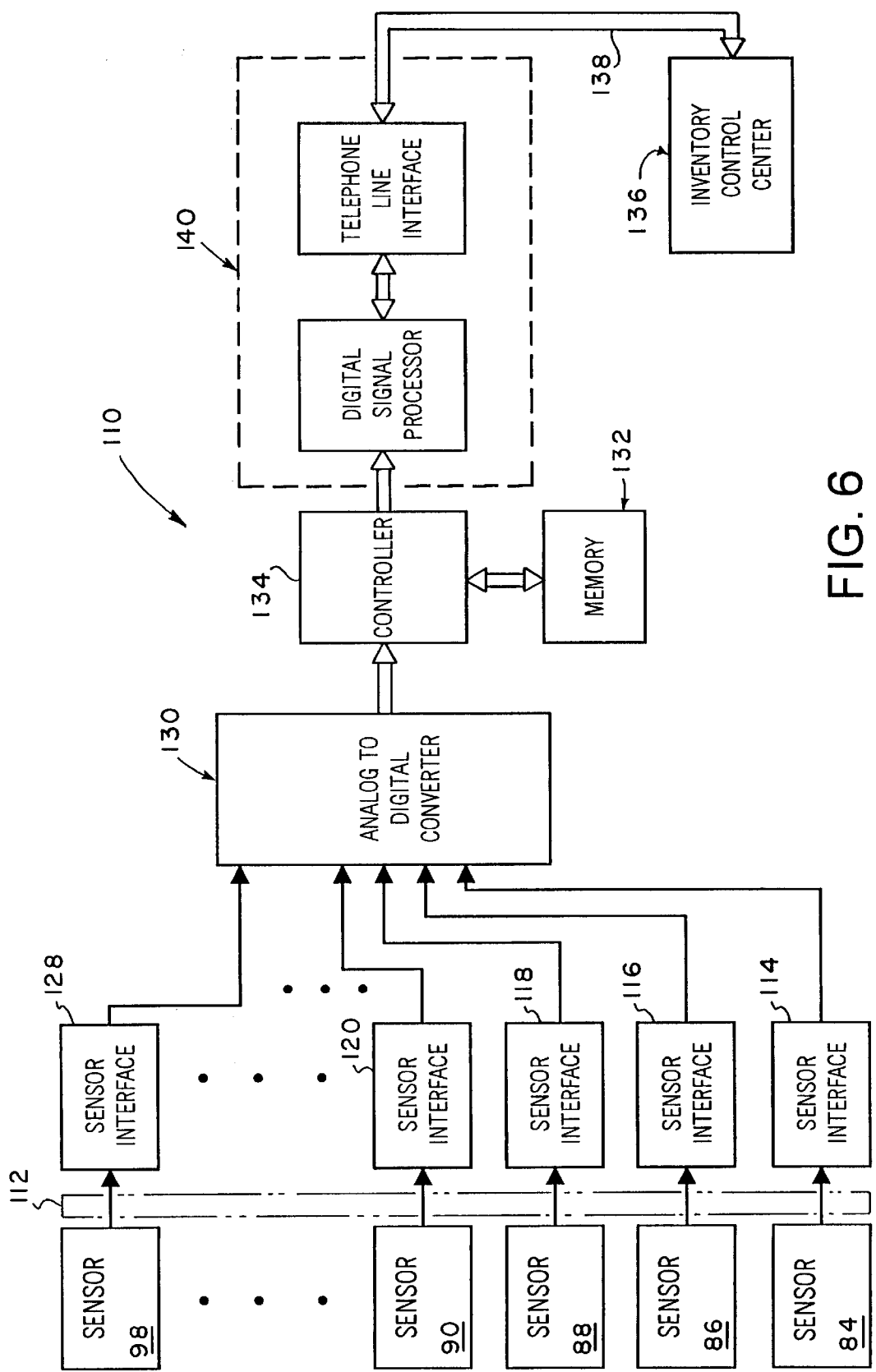

Referring now to FIG. 3 and FIG. 6, the individual magnetic reed switches of the linear array 104 are coupled to a controller 110 by a multiple conductor signal bus 112. The logic signals produced by the sensors are coupled to sensor interface circuits 114, 116, 118, . . . , 128 which decode the circuit open and circuit closed input signals from the sensors into true (logic 1) and complement (logic 0) output signals. The logic output signals are input to an analog-to-digital converter 130, which formats the analog logic input signals into digital data words. The data words are stored in a random access memory unit 132 of a microprocessor controller 134. The controller 134 is interrogated by a computer located in a remote inventory control center 136 via a telephone modem link 138. According to this arrangement, the remote computer interrogates the memory 132 through a telephone modem 140, thereby retrieving real time product stack data for each freezer unit.

The inventory replacement requirements for each bin are determined by cross-referencing each product stack data word with previously stored replacement values in a look-up table that has been customized for each bin size and product type. The distributor then uses the inventory information to determine the type and amount of each product to be loaded on the delivery truck for each route.

The problems related to product visibility and availability are overcome by the calibrated spring/stack plate arrangement. As packaged products are loaded into each storage bin, the coil spring deflects downwardly by an incremental distance proportional to the product weight added until the stack plate reaches a reference level that corresponds with a full bin. As products are removed from the storage bin, the calibrated spring deflects upwardly by an incremental distance proportional to the product weight removed until the stack plate reaches a reference level that corresponds with an empty or almost empty bin.

Through the use of the position sensors and the permanent magnet, the resting position of the stack plate and the product stack height are automatically determined. The quantity of frozen product remaining in each bin can then be determined, either on the basis of known product weight per unit or the known package volume per unit and the known bin volume. Moreover, as each product is removed from the storage bin, the bias spring extends and the stack plate moves upwardly to a new resting position, thus presenting the next remaining product in the stack in alignment with the top of the bin for convenient viewing and retrieval.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. Apparatus for remotely monitoring the inventory of stackable products contained within the holding compartment of a customer accessible, open bin storage chest comprising, n combination:

a modular storage bin dimensioned for insertion into and withdrawal from the holding compartment of the storage chest, the storage bin including a base panel and sidewall panels forming boundaries of a product load space that is open at the top allowing customer access to products stacked therein;

a coil spring disposed on the base panel, the coil spring having a total deflection length L as measured from an uncompressed (empty bin) no-load position to a compression limit position and being yieldably deflectable relative to the base panel within the product load space;

a stack plate mounted on the coil spring, the stack plate providing a platform for supporting a stack of products and being movable through the product load space in response to extension and retraction of the coil spring;

position sensors disposed at vertically spaced locations along one sidewall panel of the storage bin, the position sensors extending along at least the upper half of the storage bin from the no-load (empty bin) position to a loaded position corresponding with a deflection distance of from about one-half L to about two-thirds L, each sensor providing an output signal in true and complement logic states in response to being coupled with and decoupled from a magnetic flux field, respectively;

a permanent magnet attached to the stack plate, the permanent magnet producing a magnetic flux field that magnetically links with individual position sensors as the stack plate moves vertically through the product load space;

an analog-to-digital converter coupled to the sensors for generating a digital data word corresponding with the operating logic state conditions of the position sensors;

a controller including a random access memory unit coupled to the analog-to-digital converter for storing in the random access memory digital data words generated by the position sensors; and, a communication interface circuit coupled to the controller for transmitting information stored in the memory unit to a remote monitoring station.

2. A method of monitoring the inventory of stackable products contained within the refrigerated compartment of a self-service freezer chest comprising the steps:

partitioning the refrigerated compartment with a customer accessible, open top modular storage bin;

loading a stack of frozen packaged products on a movable support plate within the storage bin;

yieldably supporting the plate on a coil sprint having a total deflection length L as measured from an uncompressed (empty bin) position to a compression limit position;

retracting the support plate from an initial resting position in proportion to the weight load added as a packaged product is loaded onto the support plate, and extending the stack plate from an initial resting position in proportion to the weight load removed as a packaged product is unloaded from the movable support plate;

sensing the resting position of the movable support plate at vertically spaced locations along at least the upper half of the storage bin from the no-load (empty bin) position to a loaded position corresponding with a coil spring deflection distance of from about one-half L to about two-thirds L.;

generating a digital data word corresponding with the resting position of the movable support plate;

storing the digital data word in a random access memory;

transmitting the information stored in the random access memory to a remote monitoring system; and, determining the replacement product requirement for the bin by cross-referencing the digital data word with previously stored replacement product values in a look up table that has been customized for a particular bin size and product type.

3. A method of monitoring the inventory of stackable products as set forth in claim 2, wherein the sensing step is performed by:

carrying a permanent magnet on the movable support plate and holding its magnetic field in coupling alignment with a position sensor at one of the resting positions; and, operating each sensor in true and complement logic states in response to coupling alignment and absence of coupling alignment of the magnetic flux field with a sensor at each resting position, respectively.

* * * * *